United States Patent [19]

Takai et al.

[11] Patent Number: 4,661,001
[45] Date of Patent: Apr. 28, 1987

[54] LABEL PRINTER WITH TEST PATTERN FOR PRICE AND BAR CODES

[75] Inventors: Yoshihiro Takai, Shizuoka; Katsumi Uematsu, Numazu; Michio Suzuki, Mishima, all of Japan

[73] Assignee: Tokyo Electric Co., Ltd., Tokyo, Japan

[21] Appl. No.: 825,944

[22] Filed: Feb. 3, 1986

Related U.S. Application Data

[63] Continuation of Ser. No. 760,317, Jul. 29, 1985, abandoned.

[30] Foreign Application Priority Data

Aug. 8, 1984 [JP] Japan .............................. 59-166774

[51] Int. Cl.$^4$ ................................................ B41J 5/00
[52] U.S. Cl. .................................... 400/103; 400/120
[58] Field of Search .................... 400/120, 103–105; 346/76 PH; 219/216 PH

[56] References Cited

U.S. PATENT DOCUMENTS

| | | | |
|---|---|---|---|
| 3,893,558 | 7/1975 | Fulton | 400/103 |
| 4,140,404 | 2/1979 | Kaenez | 400/120 |
| 4,224,628 | 9/1980 | Murray | 346/76 PH |
| 4,284,876 | 8/1981 | Ishibashi et al. | 219/216 |
| 4,376,942 | 3/1983 | Toth et al. | 346/76 PH |
| 4,396,303 | 8/1983 | Uddgren | 400/103 |
| 4,399,749 | 8/1983 | Arai | 400/120 |
| 4,516,137 | 5/1985 | Yasui | 400/120 |

FOREIGN PATENT DOCUMENTS

| | | | |
|---|---|---|---|
| 35523 | 3/1977 | Japan | 400/103 |
| 145482 | 11/1981 | Japan | 400/104 |
| 136274 | 8/1984 | Japan | 400/104 |
| 2077970 | 12/1981 | United Kingdom | 400/103 |

Primary Examiner—E. H. Eickholt
Attorney, Agent, or Firm—Frishauf, Holtz, Goodman & Woodward

[57] ABSTRACT

A label printer includes a printing head having a plurality of heating elements arranged in a direction perpendicular to the feed direction of a label, and a data generator for supplying a plurality of article data, including a bar code and a price, to the printing head in the ordinary printing mode. In the test mode, the data generator supplies to the printing head test pattern data indicative of a plurality of test patterns which are printed in substantially the same positions as the printing positions of those plurality of article data, each of the test patterns having an area of substantially the same size as the largest one of the areas occupied by the article data to be printed in the same printing position.

26 Claims, 16 Drawing Figures

FIG. 1A

| PACKED ON | SELL BY | NO |
|---|---|---|
| | | $/100g |
| | | PRICE($) |
| | | WEIGHT(g) |
| THANK YOU | | |

FIG. 1B

BEEF

| PACKED ON | SELL BY | NO |
|---|---|---|
| 84.8.8 | 84.8.9 | 000001 |
| | | $/100g |
| ‖‖‖‖‖‖‖‖‖‖‖ | | 1.00 PRICE($) |
| | | WEIGHT(g) |
| 2000004 19462 | | 250  2.50 |
| THANK YOU | | |

FIG. 1C

| PACKED ON | SELL BY | NO |
|---|---|---|
| | | $/100g |
| | | PRICE($) |
| | | WEIGHT(g) |
| THANK YOU | | |

| | | | |
|---|---|---|---|
| PACKED ON | SELL BY | NO | |
| | | $/100g | |
| | | | PRICE($) |
| | | WEIGHT(g) | |
| THANK YOU | | | |

FIG. 4C

```
PACKED ON      SELL BY        NO
                         $/100g
                                    PRICE($)
                         WEIGHT(g)

THANK YOU
```

FIG. 4D

```
PACKED ON      SELL BY        NO
                         $/100g
                                    PRICE($)
                         WEIGHT(g)

THANK YOU
```

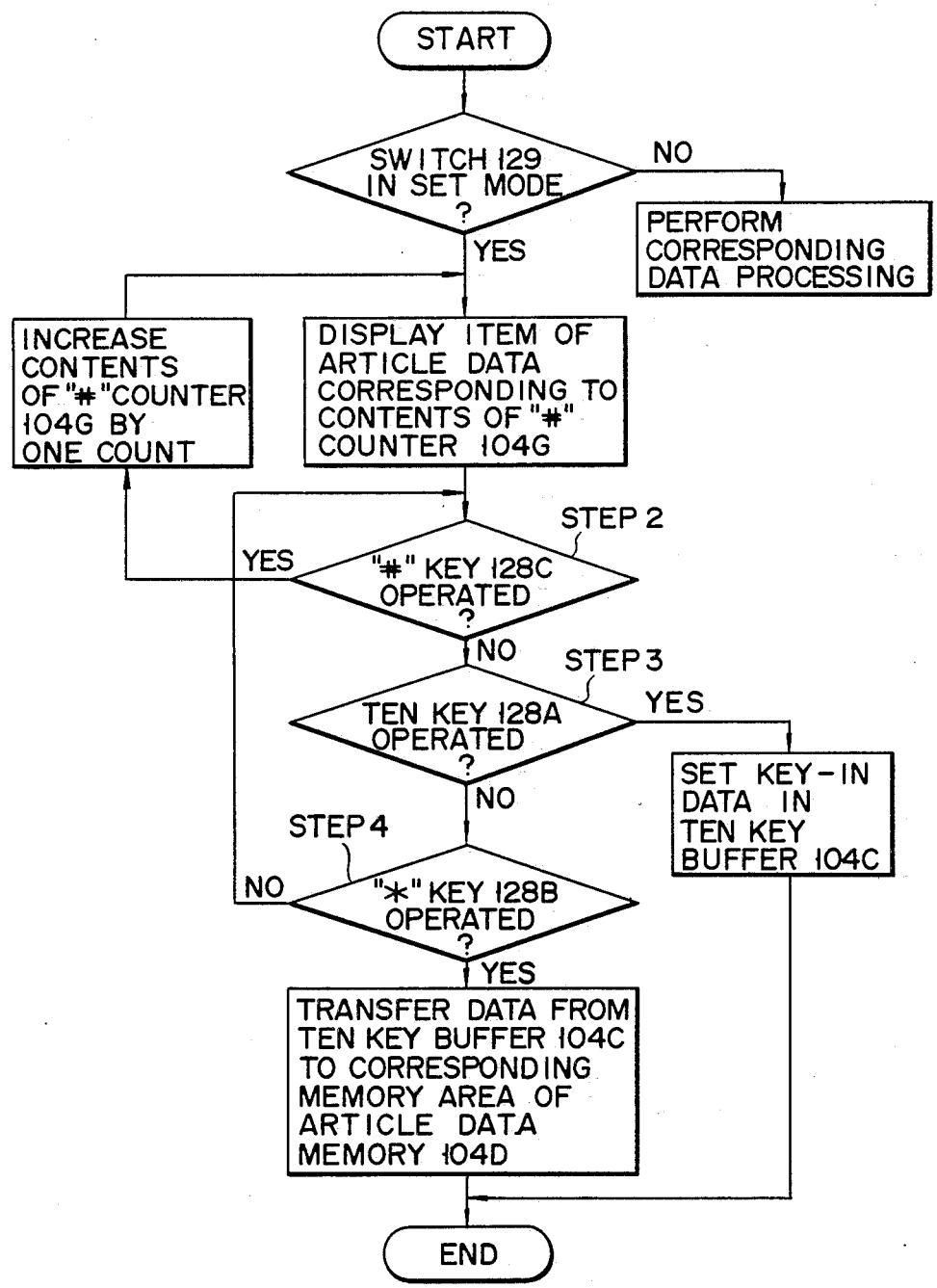

LABEL PRINTER WITH TEST PATTERN FOR PRICE AND BAR CODES

This application is a continuation of application Ser. No. 760,317, filed July 29, 1985 now abandoned.

BACKGROUND OF THE INVENTION

The present invention relates to a label printer.

Generally, label printers print information such as weight, unit price, total pirce, article name, packed-on date, sell-by date, etc., on a label. There are many label printers which also print a bar code in association with the recent widespread use of POS systems. In such label printers, it is common to use a thermal head in consideration of the printing accuracy of the bar code, noise when the label is issued and the like. Practically speaking, characteris, patterns, bar codes and the like are printed on a label synchronously with the feed timing of the label by means of a thermal head in which a number of heating elements are arranged in a direction perpendicular to the label feed direction.

In this type of label printer, it is a common practice to print variable information on a label on which fixed information has been printed. In this case, however, there is a possibility that the variable information may be printed over the fixed information. Therefore, it is necessary to check the positional relationship between the variable information to be printed and the fixed information. However, in the prior art, there is no label printer in which it is easy to check as to whether the printing position of the variable information is properly set with respect to the position of the fixed information.

SUMMARY OF THE INVENTION

It is an object of the present invention to obtain a label printer which can easily and accurately check whether the printing position of variable information to be printed is proper or not.

This object is accomplished by a label printer comprising printing means (preferably a thermal head having a plurality of heating elements arranged in a direction perpendicular to the feed direction of a label), and a data generator which, in the ordinary printing mode, supplies article data, including a bar code and a price, to the printing means, and which, in the test mode, supplies to the printing means test pattern data indicative of a plurality of test patterns which are printed in substantially the same positions as the respective printing positions of the article data, said test patterns each having an area of substantially the same size as the largest one of the print areas occupied by the article data to be printed in the same printing position.

In the test mode of the apparatus of this invention, therefore, the test patterns, each having substantially the same area as the largest one of the areas occupied by the article data to be printed in the corresponding printing position, are printed on the label in substantially the same positions as the printing positions of various kinds of article data. Thus, it is possible to easily check whether the positional relation between the fixed data, preliminarily printed on the label, and the test patterns is proper or not.

BRIEF DESCRIPTION OF THE DRAWINGS

FIGS. 1A to 1D, respectively, show a label on which the fixed information was printed by a conventional label printer, a label on which the fixed information and variable information were printed in the proper positional relation, a label on which the fixed information and check pattern were printed and a label on which the fixed information and variable information were printed in the improper positional relation;

FIGS. 4A to 4D, respectively, show a label on which the fixed information was printed by the label printer shown in FIG. 3, a label on which the fixed information and variable information were printed in the proper positional relation, a label on which the fixed information and graphic patterns were printed in the proper positional relation, and a label on which graphic patterns were printed such that parts of the graphic patterns were overlapped on the fixed information;

FIG. 10 is a flowchart showing the processing routine to change the position data in the label printer shown in FIG. 5.

DETAILED DESCRIPTION OF THE PREFERRED EMBODIMENTS

Before describing the embodiment of this invention, a problem occurring in the prior art label printer is explained in more detail with reference to FIGS. 1A to 1D.

FIG. 1A shows a conventional label. It is common for a label in use to have had fixed information such as label headings concerning packed-on data, sell-by date, article number, unit price (dollar) per 100 g, total weight (g) of an article, price (dollar), etc., preliminarily printed as color information. FIG. 1B shows a label on which the weight and the like are printed by a printing means, such as a thermal head. In such a label printer, however, even if only one of the heating elements of the thermal head breaks, a problem such that the bar code cannot be accurately printed, or the like, arises. Therefore, as shown in FIG. 1C, an abnormality check pattern, using all of the heating elements, is printed on the label for the purpose of checking to see if an abnormality in the heating elements exists or not.

Figure 1D:
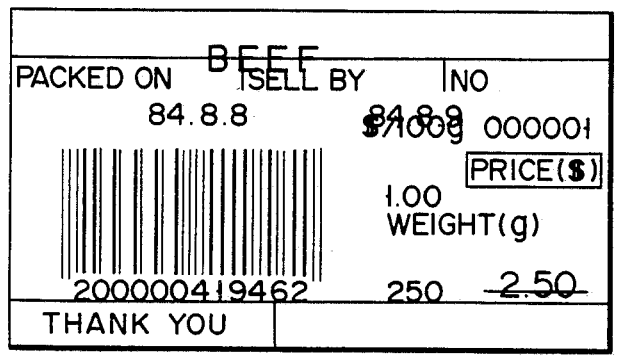

When variable information such as actual article name, total weight, unit price, total price, etc., is printed on the label on which the fixed information has preliminarily been printed, as shown in FIG. 1D, the variable information can either be overlapped on the portion where the fixed information has preliminarily been printed or shifted slightly over a permissible range with respect to the printed position of the fixed label heading information. The adjustment for such a vital shift in the printing position is performed by means of a label feed control mechanism using a label detector or the like. However, prior to performing such an adjustment, it is necessary to check whether the printing position is correct or not.

With respect to this point, it is possible to check to see if the printing position is suitable or not by issuing the label to check for an abnormality in the heating elements, as shown in FIG. 1C. Unfortunately, all of the printed information cannot be individually checked. Thus, an ordinary label is issued and the printing position is determined as being normal if the label is in the state shown in FIG. 1B. Conversely, the printing position is determined as being incorrect if the label is in the state shown in FIG. 1D. If, however, in the interest of checking all the printed information for the purpose of checking the printing position, a weighing of an article is undertaken prior to issuing the ordinary label, the processing of the ordinary label results. This is an inconvenience for the individual who processes the number of packs, weights, and total prices. Yet, upon printing of the bar code, for example, margins, each consisting of seven modules, are needed in the outsides of the right and left guard bar of the bar code; it is difficult to discriminate whether these margins are assured or not merely by observing the ordinary label issued as shown in FIG. 1B or 1D. Consequently, an error is likely to occur when the bar code is read by a scanner.

Figure 2:
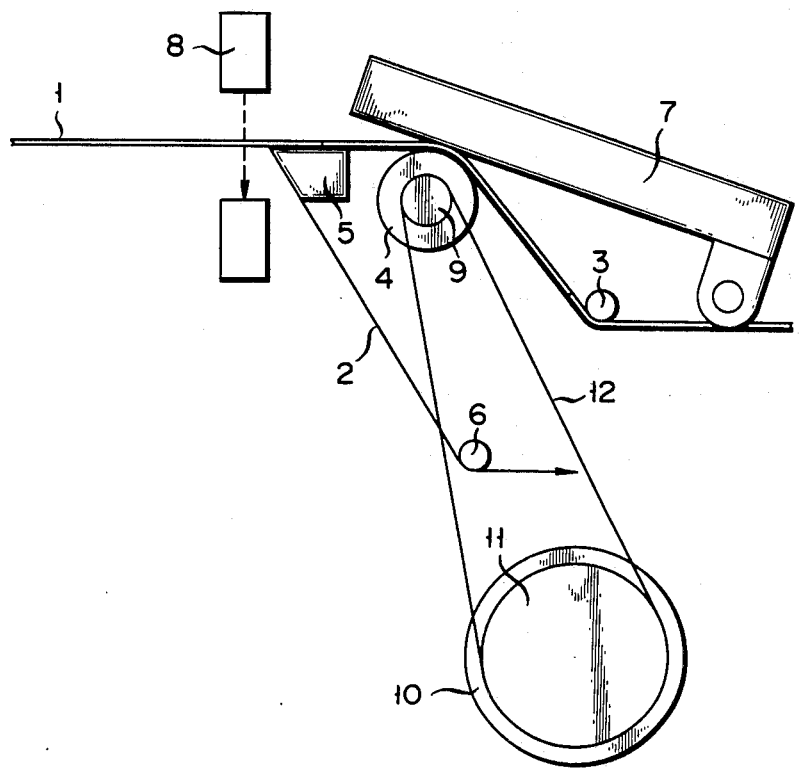
FIG. 2 is a schematic arrangement diagram of a paper feed section and a printing section of a label printer according to one embodiment of the present invention.

An arrangement of a label printer according to one embodiment of the present invention will now be described with reference to FIGS. 2 and 3. First, FIG. 2 shows a schematic arrangement of a paper feed section and a printer section in which the labels 1, having a rectangular shape on which the fixed information has already been printed, are continuously adhered on a long-scale pasteboard or backing sheet 2. The pasteboard 2 is wrapped around a pasteboard take-up section (not shown) through a guide roller 3, a platen roller 4, a peel-off plate 5 and guide roller 6. A printing means, such as a thermal head 7 for printing on the label 1, and in contact therewith, is arranged over the platen roller 4. The thermal head 7 comprises number of heating elements arranged in a direction perpendicular to the label feed direction. The pasteboard 2 is suddenly bent at the edge portion of the peel-off plate 5 so that the label 1 is peeled off from the pasteboard 2 and horizontally pushed out. To detect the label 1 sent out in this way, a label detector 8 is arranged in proximity to the peel-off plate 5. Further, a pulley 9 is formed coaxially with the platen roller 4. A timing belt 12 is arranged between the pulley 9 and a pulley 11 attached to a shaft of a pulse motor 10. Such a paper feed section and printer section are explained in detail in, for example, U.S. Pat. No. 4,434,911.

Figure 3:
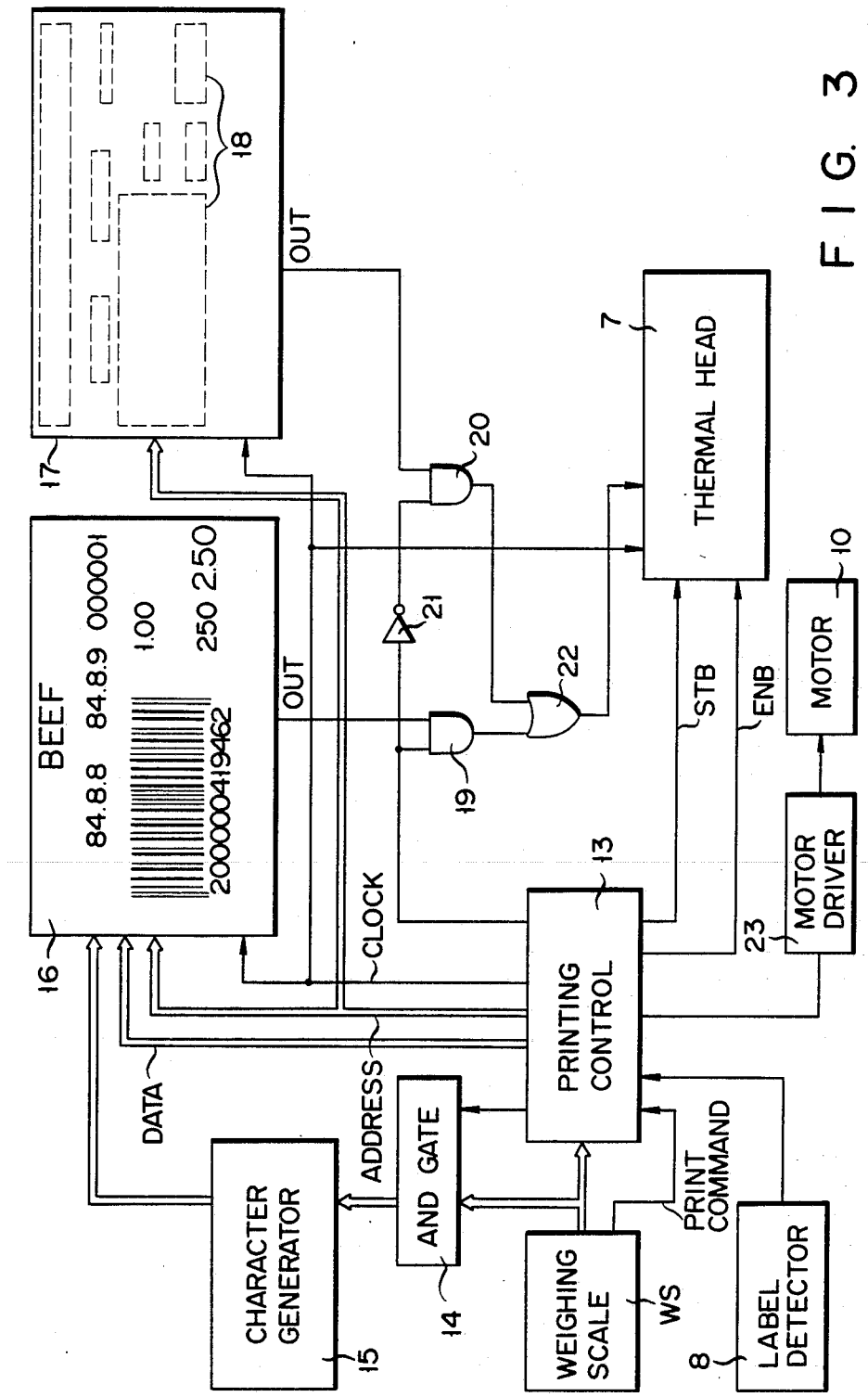
FIG. 3 is a block diagram of the label printer according to one embodiment of the invention.

FIG. 3 shows a block diamgram of a control circuit controlling the operation of such a printer. Fundamentally, the operation of the printer is controlled by a printing control 13. For this purpose, a print command signal from a weighing scale WS, and a signal from the label detector 8 are supplied to the printing control 13. Printing data such as weight, article name and the like from the weighing scale WS is inputted to an AND gate 14 together with a signal from the printing control 13. An output of the AND gate 14 is inputted to a character generator 15. A print image RAM 16, for use in the ordinary printing mode, is provided to store the variable information including article name data such as "BEEF" or the like, weight value data, price data, date data, etc., in response to an output from the character generator 15, and an address signal, a clock signal and the like from the printing control 13. A test print image ROM 17, for use in the test printing mode, is provided separately from the print image RAM 16. Graphic patterns 18 indicative of the outlines, each having substantially the same size as the largest one of the areas occupied by the variable information to be printed in the corresponding printing position, are written into the test print image ROM 17 at corresponding memory locations such that the respective graphic patterns may be printed in the same positions where various kinds of data written in the print image RAM 16 are to be printed. In particular, with respect to the graphic pattern corresponding to the bar code, this graphic pattern denotes the pattern indicative of the outline including the right and left margins of the bar code. An address signal and a clock signal are supplied from the printing control 13 to the test print image ROM 17. Conversely, a strobe signal STB, an enable signal ENB and a clock signal CLK are inputted from the printing control 13 to the thermal head 7. Data is supplied as a PIX IN signal to a shift register of the thermal head 7 under the control of the clock signal, thereby allowing the printing operation to be performed. In this case, in response to a selection signal from the printing control 13, a selection is made with regard to whether the PIX IN signal is supplied from the print image RAM 16 or from the test print image ROM 17. For this purpose, AND gates 19 and 20, an inverter 21 and an OR gate 22 are provided. Further, the printing control 13 controls the driving of the pulse motor 10 through a driver 23.

Figures 4A, 4B:

In this embodiment, the printing is performed on a label 1 on which the fixed information has already been printed, as shown in FIG. 4A. A consideration is now made with respect to the ordinary printing mode in that, by setting a key switch on a keyboard (not shown) on the weighing scale WS, for example, into the printing mode, a selectin signal "1" is outputted from the printing control 13 to thereby allow printing to be performed on the basis of the data in the print image RAM 16. In this case, when a print command signal is input to the printing control 13, the data in the print image RAM 16 is read out on a line by line basis from the lower portion under the control of the clock signal, and sequentially outputted as the PIX IN signal to the thermal head 7, through the AND gate 19 and OR gate 22, so that printing is performed. At the same time, the platen roller 4 is rotated by one pitch. By repeating such an operation, as shown in FIG. 4B, the label 1 on which the article name, price, weight, unit price, etc., are printed, is issued.

In the test printing mode of the apparatus according to the present invention, by setting the key switch on the keyboard of the weighing scale WS, for example, into the test mode, and by outputting a selection signal "0" from the printing control 13, printing is performed on the basis of the data in the test print image ROM 17. The operation at this time is substantially the same as that in the ordinary printing mode, except that, the data in the ROM 17 is used as the PIX IN signal in place of the data from the RAM 16. FIGS. 4C and 4D show examples of the print results in this test printing mode. If the print result shown in FIG. 4C is realized, it will be found that the normal print, as shown in FIG. 4B, can be obtained upon ordinary printing. Conversely, if, as shown in FIG. 4D, the graphic patterns 18 are overlapped on the fixed information which has been printed preliminarily, it will be understood that even if an ordinary label is issued, the printing positions of the variable information will have been shifted beyond the permissible range, as shown in FIG. 1D. In other words, according to this embodiment, the graphic patterns 18 are printed on the label 1 in the test printing mode to thereby check the printing positions of the variable information. Therefore, the shift of the printing positions with respect to the preliminarily printed fixed information can be more accurately discerned as compared with the prior art checking method involving merely the issuance of the ordinary label. Thus, in the present invention, the adjustment of the printing positions when the printing positions are wrong can, by way of the label feed control mechanism, also be accurately performed. In addition, according to the invention, there is no need to weigh an article and to issue the ordinary label in order to check the printing positions. Therefore, no inconvenience is created for the individual who processes the number of packs, weights and total price. Further, according to the invention, the graphic pattern 18 corresponding to the bar code is processed as an outline pattern, including the right and left margins, such that the right and left shift of the label 1, in association with the label feed, can also be confirmed and a correction made so that the right and left margins of the bar code can be maintained.

In the above embodiment, the ROM 17, only for use in the test printing mode, is provided. However, the ROM 17 may be omitted with graphic patterns being generated from the character generator 15 in the test printing mode and stored in the print image RAM 16. These graphic patterns may then be supplied to the thermal head, thereby allowing the test printing operation to be executed. According to this method, the cost can be reduced.

Figure 5:
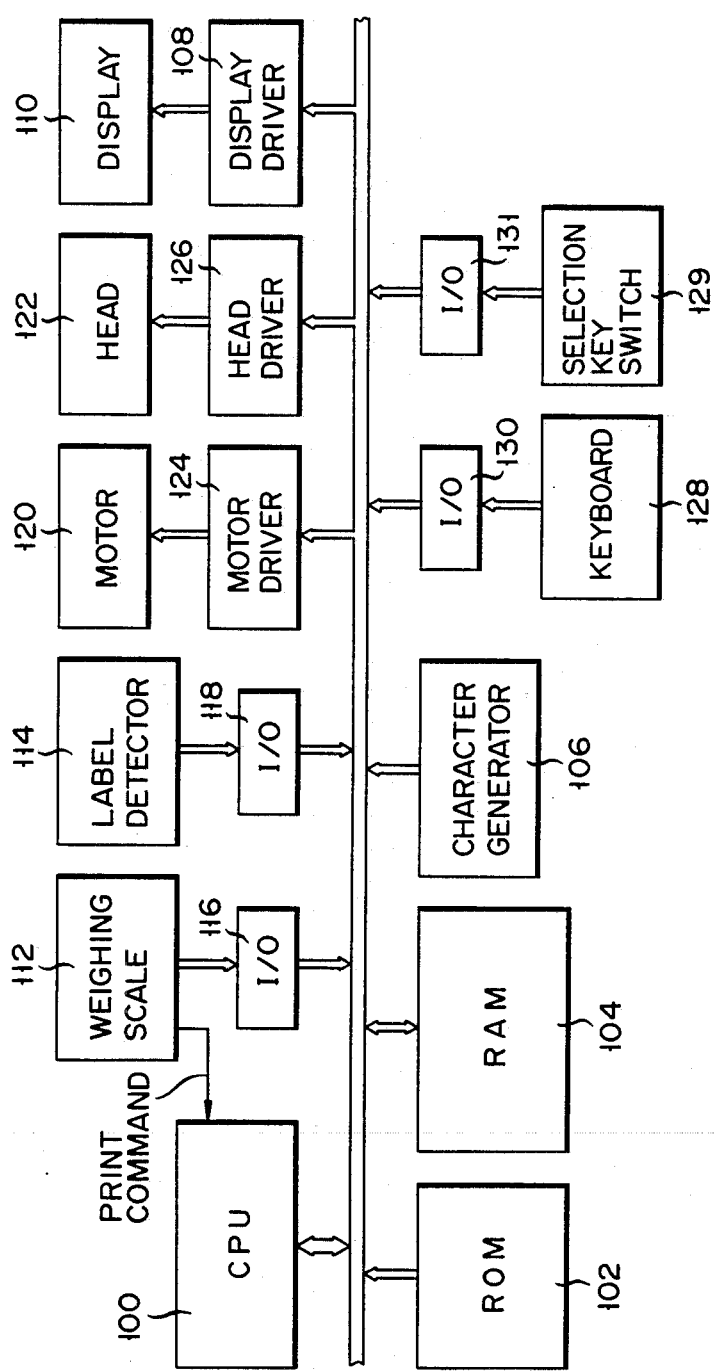
FIG. 5 is a block diagram of a label printer according to another embodiment of the invention.

FIG. 5 is a block diagram of a printer according to another embodiment of the invention. This printer comprises a central processing unit (CPU) 100, a read only memory (ROM) 102 in which a control program or the like is stored and which is connected to the CPU 100 through a data bus, and a random access memory (RAM) 104 for temporarily storing weight data, characters, codes, data, etc. A character generator 106 and a display driver 108 to drive a display 110 are connected to the CPU 100. Further, a weighing scale 112 and a label detector 114 are connected to the CPU 100 through I/O ports 116 and 118, respectively. A paper feed motor 120 and a thermal head 122 are connected to the CPU 100 through a motor driver 124 and a head driver 126, respectively. A keyboard 128 and a selection key switch 129 are connected to the CPU 100 through I/O ports 130 and 131, respectively.

Figure 6:
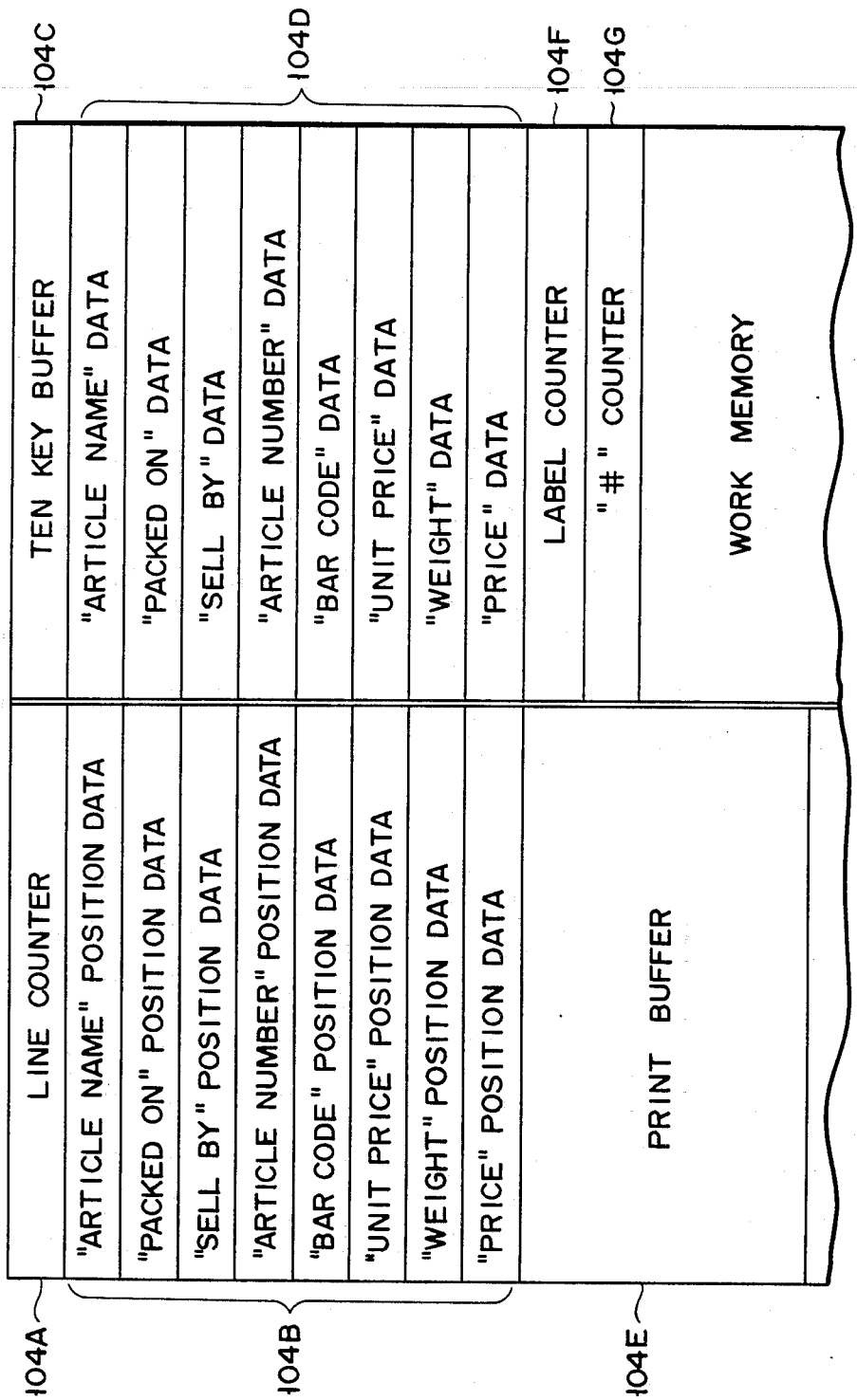
FIG. 6 is a map diagram of a RAM which is used in the label printer shown in FIG. 5.

FIG. 6 shows a map of the RAM 104 shown in FIG. 5. The RAM 104 comprises a line counter 104A; a position data memory 104B to store "ARTICLE NAME", "PACKED ON", "SELL BY", "ARTICLE NUMBER", "BAR CODE", "UNIT PRICE", "WEIGHT", and "PRICE" position data; a ten key buffer 104C; an article data memory 104D to store "ARTICLE NAME", "PACKED ON", SELL BY", "ARTICLE NUMBER", "BAR CODE", "UNIT PRICE", "WEIGHT", and "PRICE" data; a print buffer 104E; a label counter 104F; and a "#" counter 104G.

Figure 7:
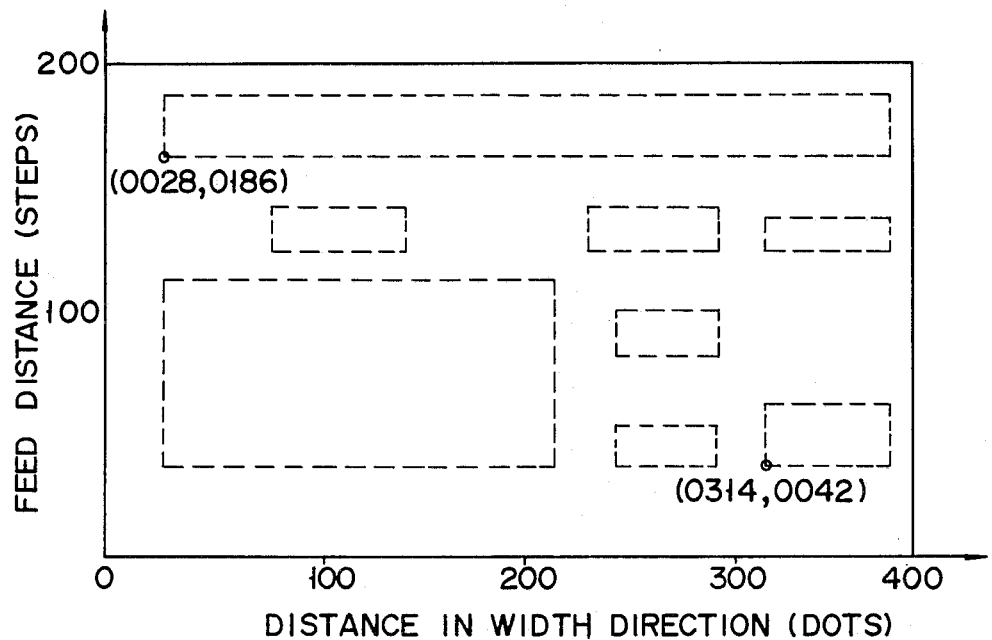
FIG. 7 is a diagram showing the positional relations of various kinds of graphic patterns on the label.

FIG. 7 shows the coordinate positions of the graphhic patterns designated by various kinds of position data. In FIG. 7, the ordinate indicates a feed amount of the paper to be fed by the stepping motor 120 at every step, using the lowest end of the label as a reference position, while the abscissa indicates a distance corresponding to the number of the dots of the thermal head 122, as measured width wise from the left end of the label 1. The position data includes reference coordinate information of a corresponding graphic pattern, the information, for example, of the coordinates at the left lower end and the width and height of the graphic pattern. For example, the "ARTICLE NAME" position data in FIG. 7 denotes the reference coordinates of (0028, 0186), the width of (0325) and the height of (0035). The "PRICE" position data indicates the reference coordinates of (1314, 0042), the width of (0063) and the height of (0040).

Figure 8:
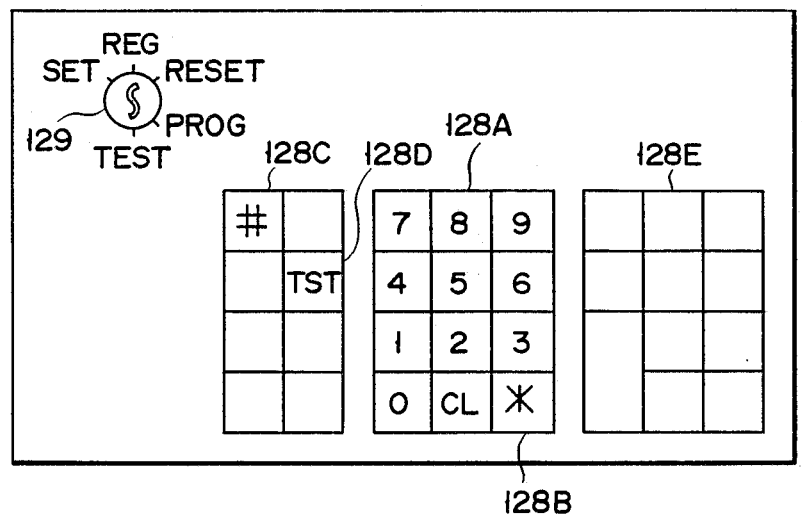
FIG. 8 is an arrangement diagram of key switches and a keyboard of the label printer shown in FIG. 5.

FIG. 8 shows an example of the keyboard 128 and selection key switch 129 shown in FIG. 5. The keyboard 128 includes a ten key section 128A, a * key 128B, a # key 128C, a TST key 128D, and function keys 128E, including keys which are operated when the article name, weight, unit price, etc., are set. The key switch 129 is selectively set into "registration", "reset", "program", or "test" positions".

Figure 9:
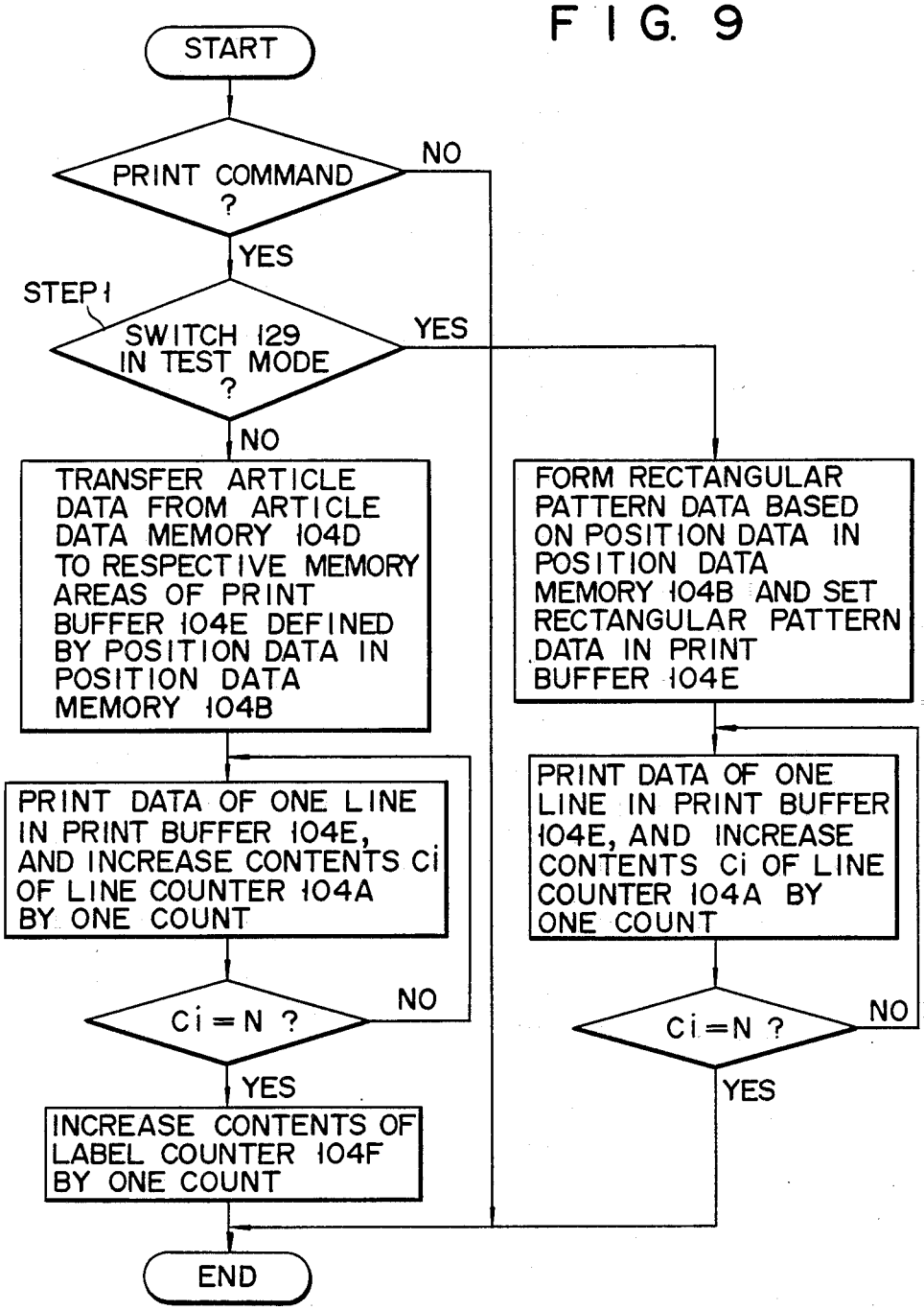
FIG. 9 is a flowchart for explaining the printing operation of the label printer shown in FIG. 5.

In the ordinary printing mode, various kinds of position data are stored into the position data memory 104B, and various kinds of article data produced by the CPU 100 in accordance with both the key data from the keyboard 128 and the weight data from the weighing scale are stored into the article data memory 104D. Assume now that the print command is generated from the weighing scale 112. In this case, the CPU 100 sets "1" into the line counter 104A, and then checks to see if the key switch 129 is set into the test mode or not in STEP 1, as shown in the flowchart indicative of the print routine in FIG. 9. If "NO" in STEP 1, the CPU 100 reads out the position data and article data from the position data memory 104B and article data memory 104D, respectively. Then, the CPU 100 writes the article data such as the "ARTICLE NAME" data, "PACKED ON" data, etc., into the memory areas of the print buffer 104E designated for and corresponding to such data as the "ARTICLE NAME" position data, "PACKED ON" position data, etc. Next, the CPU 100 reads out, on a line by line basis, the print data from the print buffer 104E, and allows them to be printed on the label, while simultaneously increasing the count of the line counter 104A by one count. When it is detected that the content of the line counter 104A reaches a predetermined value N, namely, that the printing of the label is completed, the content of the label counter 104F is increased by one count and the print routine is terminated.

Contrarily, if "YES" in STEP 1, the CPU 100 reads out the position data such as the "ARTICLE NAME" position data, "PACKED ON" position data, etc., from the position data memory 104B. For example, as indicated by the broken lines in FIG. 4C, the CPU 100 stores into the print buffer 104E the graphic pattern data indicative of the positions and the sizes of the graphic patterns or rectangular patterns determined by those position data. Next, in a manner similar to the above, the print data is read out one line at a time from the print buffer 104E and printed on the label, and, at the same time, the content of the line counter 104A is increased by one count. When the content of the line counter 104A reaches the predetermined value N, this print routine terminates without changing the content of the label counter 104F.

FIG. 10 shows a processing routine to change desired position data in the position data memory 104B. When a key is operated, the CPU 100 first checks to see if the key switch 129 is in the "SET" mode or not. If it is not in the "SET" mode, the key-in data is processed in accordance with the mode set by the key switch 129.

Contrastingly, in the case where the key switch 129 is in the "SET" mode, the item of article data corresponding to the content of the "#" counter 104G is displayed on the display 110. For example, when the content of the counter 104G is "0" to "7", "ARTICLE NAME", "PACKED ON", "SELL BY", "ARTICLE NUMBER", "BAR CODE", "UNIT PRICE", "WEIGHT" and "PRICE" are displayed on the display 110. The content of the "#" counter 104G is increased by one count whenever it is detected that the "#" key 128C was operated in STEP 2. If the "#" key is operated when the count value is "7", the content of the counter 104G becomes "0". Therefore, whenever the "#" key 128C is operated, the items of the different article data are sequentially displayed on the display 110. If "NO" in STEP 2, a check is made in STEP 3 to see if the ten key section 128A has been operated or not. If "YES" in STEP 3, the key-in data is stored into the ten key buffer 104C. If "NO" in STEP 3, then it is checked, in STEP 4, whether the "*" key 128B has been operated or not. If "YES" in STEP 4, the key-in data in the ten key buffer 104C is set into the corresponding memory area in the article data memory 104D designated by the content of the "#" counter 104G, and this processing routine is then terminated. If "NO" in STEP 4, the CPU 100 again executes STEP 2.

Now, an explanation will be made with respect to the case where the "PRICE" position data includes the reference coordinates of (10325, 0045), these coordinates being changed to new reference coordinates of (0329, 0055). In this case, the key switch 129 is first set into the "SET" mode. Then, the content of the "#" counter 104G is set to "7" by operating the "#" key 128C, thereby designating the "PRICE" memory area in the position data memory 104B. Next, the keys indicative of numeric values of "0", "3", "2", "9", "0", "0", "5", and "5" in the ten key secton 128A are sequentially operated in accordance with this order. Due to this, the numerical data of (0329, 0055) is stored into the ten key buffer 104C. Subsequently, by operating the "*" key 128B, the numerical data of (0329, 0055), in the ten key buffer 104C, is written as new reference coordinate data into the "PRICE" memory area designated by the content "7" in the "#" counter 104G. In this case, the width data and height data in the "PRICE" memory area are not changed. Thereafter, when, for instance, the print command is generated from the weighing scale 112 in the state whereby the key switch 129 was set into the registration mode, the CPU 100 writes the corresponding article data, from the article data memory 104D, into the memory locations in the print buffer 104E designated by various kinds of position data in the position data memory 104B.

In this way, the printing positions of the article data such as "BAR CODE", "PRICE" data, etc., can be easily changed to desired positions.

What is claimed is:

1. A label printer comprising:
    printing means for printing data on a label which is fed thereto; and
    data generating means coupled to said printing means and being selectively operable in an ordinary printing mode and a test mode, said data generating means including means for supplying, in an ordinary printing mode, a plurality of article data, including a bar code and a price, to said printing means for printing of same on a label; and means for supplying, in a test mode, test pattern data indicative of a plurality of predetermined test patterns to said printing means for printing of said test pattern data on a label, each of said test patterns having a given height and width and being printed by said printing means in substantially the same position as the printing position of a corresponding one of said article data, and each of said test patterns having a height and width substantially the same as the height and width of the largest one of the print areas occupied by the article data to be printed in a corresponding printing position on said label, so as to check alignment of said label relative to said printing means to enable proper positioning of the article data including said bar code and price to be printed on labels fed thereto.

2. A label printer according to claim 1, wherein said data generaing means comprises first memory means for storing said plurality of article data, second memory means for storing said plurality of test patterns, and control means for selectively reading out data from said first and second memory means and supplying the data to said printing means.

3. A label printer according to claim 2, wherein said control means comprises:
    a logic circuit for supplying output data from said first and second memory means to said printing means in first and second operation modes, respectively, and
    a control unit including means for reading out the data from said first and second memory means and for supplying a control signal to said logic circuit to thereby set said logic circuit into the first or second operation mode.

4. A label printer according to claim 1, wherein said data generating means comprises:
    memory means in which said plurality of article data and said test pattern data are stored,
    a print buffer memory coupled to said printing means, and
    control means for, in the ordinary printing mode, sequentially reading out a plurality of article data from said memory means and also writing said article data into said print buffer memory, and for, in the test mode, sequentially reading out said test pattern data from said memory means and also writing said test pattern data into said print buffer memory.

5. A label printer according to claim 1 wherein said data generating means comprises:
    memory means in which said plurality of article data and a plurality of position data indicative of the printing positions and sizes of said plurality of test patterns are stored,
    a print buffer, and
    control means for, in the ordinary printing mode, writing the corresponding article data into the memory positions of said print buffer specified by said plurality of position data, and for, in the test mode, writing into said print buffer the test pattern data corresponding to said position data.

6. A label printer according to claim 5, which further comprises;
    selecting means for selectively designating one of said plurality of position data, and
    numeral keys for entering numerical data, and
    said control means including means for changing the position data designated by said selecting means in accordance with the operations of said numeral keys, and for writing said changed position data into said memory means.

7. A label printer according to claim 6, further comprising a counter for executing a counting operation whenever all of said plurality of article data are completely supplied to said printing means in the ordinary printing mode.

8. A label printer according to claim 5, further comprising a counter for executing a counting operation whenever all of said plurality of article data are completely supplied to said printing means in the ordinary printing mode.

9. A label printer according to claim 1, wherein said test patterns are graphic test patterns.

10. A label printer according to claim 1, wherein said printing means comprises a thermal head having a plurality of heating elements arranged in a direction perpendicular to the feed direction of a label.

11. A label printer according to claim 10, wherein said test patterns are graphic test patterns.

12. A label printer according to claim 2, wherein said printing means comprises a thermal head having a plurality of heating elements arranged in a direction perpendicular to the feed direction of a label.

13. A label printer according to claim 12, wherein said test patterns are graphic test patterns.

14. A label printer according to claim 3, wherein said printing means comprises a thermal head having a plurality of heating elements arranged in a direction perpendicular to the feed direction of a label.

15. A label printer according to claim 14, wherein said test patterns are graphic test patterns.

16. A label printer according to claim 4, wherein said printing means comprises a thermal head having a plurality of heating elements arranged in a direction perpendicular to the feed direction of a label.

17. A label printer according to claim 16, wherein said test patterns are graphic test patterns.

18. A label printer according to claim 5, wherein said printing means comprises a thermal head having a plurality of heating elements arranged in a direction perpendicular to the feed direction of a label.

19. A label printer according to claim 18, wherein said test patterns are graphic test patterns.

20. A label printer according to claim 6, wherein said printing means comprises a thermal head having a plurality of heating elements arranged in a direction perpendicular to the feed direction of a label.

21. A label printer according to claim 20, wherein said test patterns are graphic test patterns.

22. A label printer according to claim 7, wherein said printing means comprises a thermal head having a plurality of heating elements arranged in a direction perpendicular to the feed direction of a label.

23. A label printer according to claim 22, wherein said test patterns are graphic test patterns.

24. A label printer according to claim 8, wherein said printing means comprises a thermal head having a plurality of heating elements arranged in a directon perpendicular to the feed direction of a label.

25. A label printer according to claim 24, wherein said test patterns are graphic test patterns.

26. A label printer according to claim 1, wherein said dayta generating means supplies only article data to said printing means when in said ordinary printing mode, and supplies only test pattern data to said printing means when in said test mode.

* * * * *